United States Patent
Keohane et al.

(10) Patent No.: US 7,574,671 B2
(45) Date of Patent: Aug. 11, 2009

(54) APPARATUS AND METHOD OF DISPLAYING ELECTRONIC DESKTOPS BASED ON A SCHEDULER OR NETWORK CONNECTION

(75) Inventors: Susann Marie Keohane, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 11/182,575

(22) Filed: Jul. 18, 2005

(65) Prior Publication Data

US 2005/0268246 A1 Dec. 1, 2005

Related U.S. Application Data

(62) Division of application No. 09/998,401, filed on Nov. 15, 2001, now abandoned.

(51) Int. Cl.
*G06F 3/048* (2006.01)
*G06F 3/00* (2006.01)

(52) U.S. Cl. .................. 715/778; 715/775; 715/733

(58) Field of Classification Search ........... 715/733, 715/740, 742, 749, 775, 778
See application file for complete search history.

(56) References Cited

U.S. PATENT DOCUMENTS

| | | | |
|---|---|---|---|
| 5,642,303 A | 6/1997 | Small et al. | |
| 6,061,795 A * | 5/2000 | Dircks et al. | 726/4 |
| 6,278,448 B1 | 8/2001 | Brown et al. | |
| 6,343,320 B1 | 1/2002 | Fairchild et al. | |
| 6,563,430 B1 | 5/2003 | Kemink et al. | |
| 6,710,788 B1 | 3/2004 | Freach et al. | |
| 6,920,606 B1 * | 7/2005 | Jablonski et al. | 715/501.1 |
| 7,127,745 B1 * | 10/2006 | Herse et al. | 726/30 |
| 7,246,374 B1 * | 7/2007 | Simon et al. | 726/16 |
| 2003/0195950 A1 * | 10/2003 | Huang et al. | 709/219 |

* cited by examiner

*Primary Examiner*—Dennis Bonshock
(74) *Attorney, Agent, or Firm*—Diana R. Gerhardt (57) ABSTRACT

A method and apparatus for selecting a desktop from a plurality of desktops for use upon turning on a computer system are provided. When the computer system is turned on, it is first determined whether there is more than one desktop available in the computer system. If so, the computer system determines whether a network address is associated with some or all of the available desktops by comparing its network address with the network addresses that are associated with the available desktops. If the computer system finds a network address that is the same as its own network address, the computer system then uses the desktop associated with the stored network address.

8 Claims, 8 Drawing Sheets

APPARATUS AND METHOD OF DISPLAYING ELECTRONIC DESKTOPS BASED ON A SCHEDULER OR NETWORK CONNECTION

RELATED APPLICATIONS

The present invention is a divisional application of U.S. patent application Ser. No. 09/998,401 filed on Nov. 15, 2001, now abandoned entitled APPARATUS AND METHOD OF DISPLAYING ELECTRONIC DESKTOPS BASED ON A SCHEDULER OR NETWORK CONNECTION.

BACKGROUND OF THE INVENTION

1. Technical Field

The present invention is directed to electronic desktops. More specifically, the present invention is directed to an apparatus and method of selecting an active electronic desktop based on a scheduler or network connection.

2. Description of Related Art

At present, the most commonly used user interface paradigm for computing devices is the windows-icons-desktop-folders metaphor prevalent on computer systems such as the Macintosh or other computer systems running the Microsoft Windows operating system. Under this paradigm, the screen of a computer system simulates an office desktop that contains various objects. The objects are represented as graphical "icons" that can be opened as "windows" on the screen. A user can create an unlimited number of overlapping windows, and the size of the windows can be adjusted dynamically. The user can also hierarchically create and manipulate "folders" that reflect how the information is organized on the computer system's storage devices.

Most users equate a desktop to the screen that is first displayed when a computer system is turned on. Note that here "screen" is used to include items such as icons, background image, screen saver image that are displayed as well as video mode settings etc. used to display the items. Depending on the circumstance and environment (e.g., work) in which the computer system (e.g., a laptop) is being used, some icons, background image, screen saver image etc. may not be appropriate for display. In this case, the user has to delete the offending items from the desktop or replace them with others. However, in some other environments (e.g., away from work) the user may want these items displayed. Presently, a user can only have one desktop be automatically displayed whenever a computer system is turned on.

Thus, what is needed is an apparatus and method that automatically display a particular desktop based on the environment in which the computer system is being used.

SUMMARY OF THE INVENTION

The present invention provides a method and apparatus for selecting a desktop from a plurality of desktops for use upon turning on a computer system. In an embodiment of the invention, it is first determined whether there is more than one desktop available in the computer system. If so, it is next determined whether any one of the desktops is associated with a scheduler. If so, the time specified in the scheduler is consulted. If the present time falls within the time in the scheduler, the desktop associated with the scheduler is used.

In another embodiment of the invention, a network address is associated with some or all of the available desktops. Upon turning the computer system on, the computer compares its network address with a network address associated with each of the desktops. If the computer system finds a network address that is the same as its network address, the computer system then uses the desktop associated the stored network address.

In yet another embodiment, a desktop may downloaded from the Internet for use. For instance, when a user accesses the Internet through an ISP, the ISP may download the desktop to be used.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
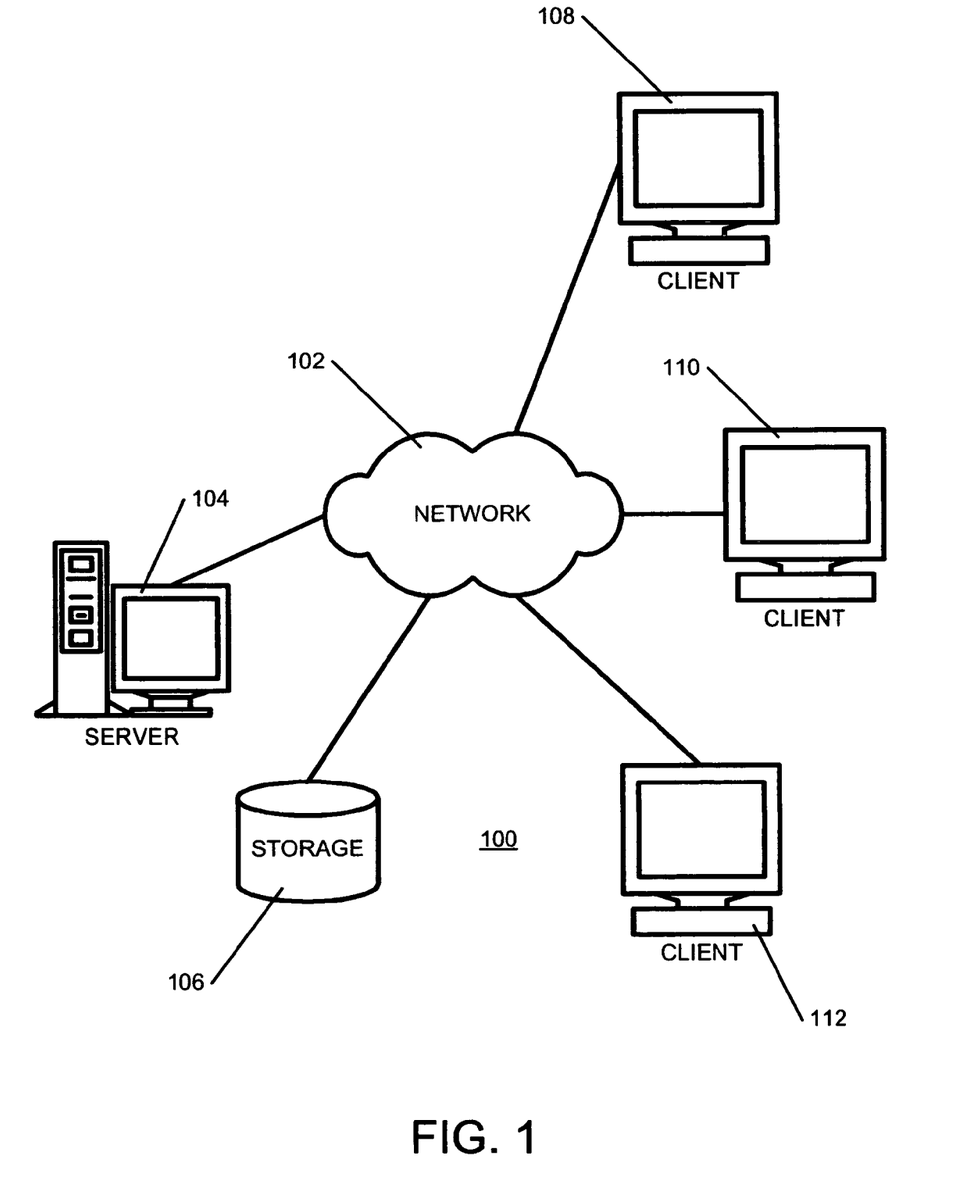
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
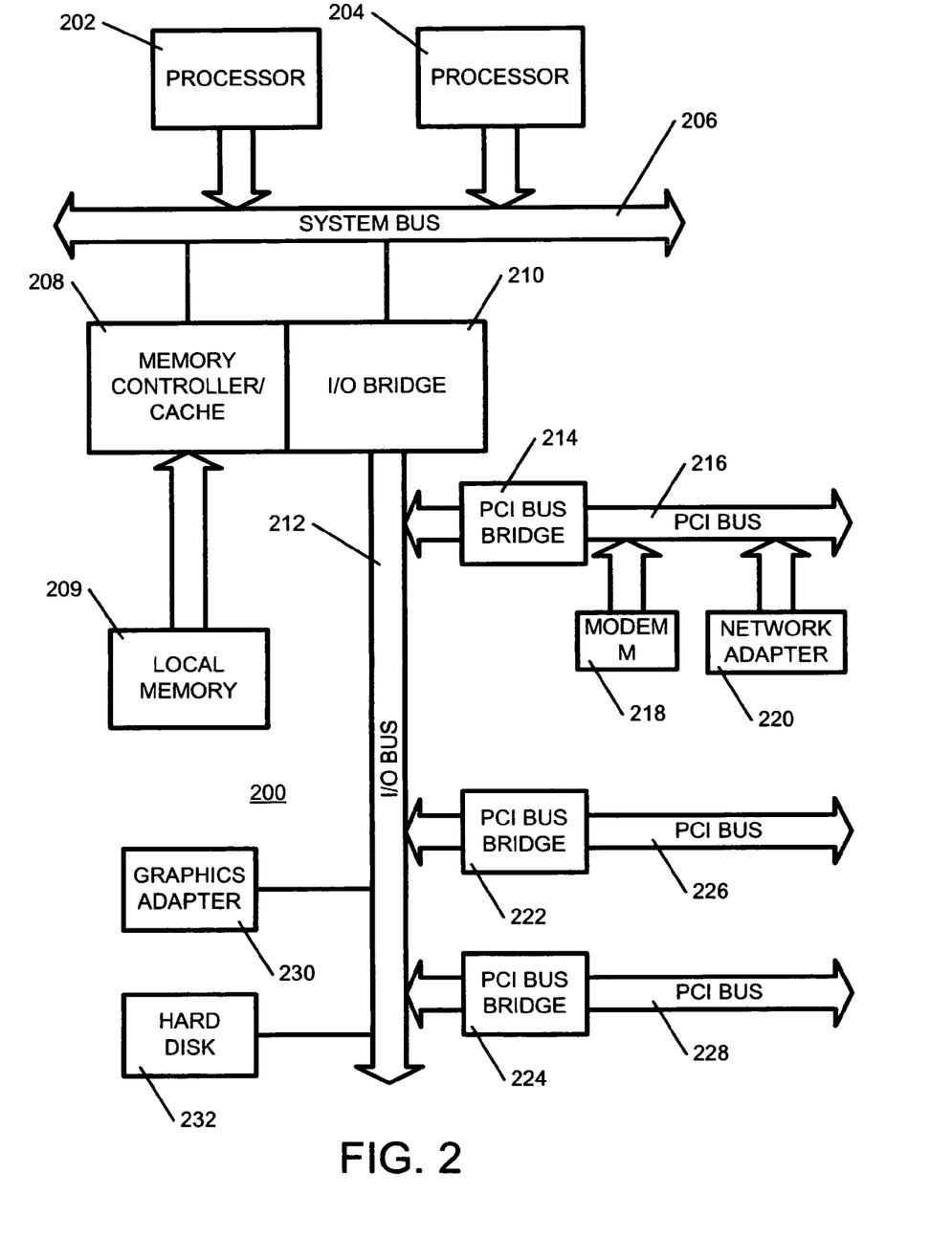
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
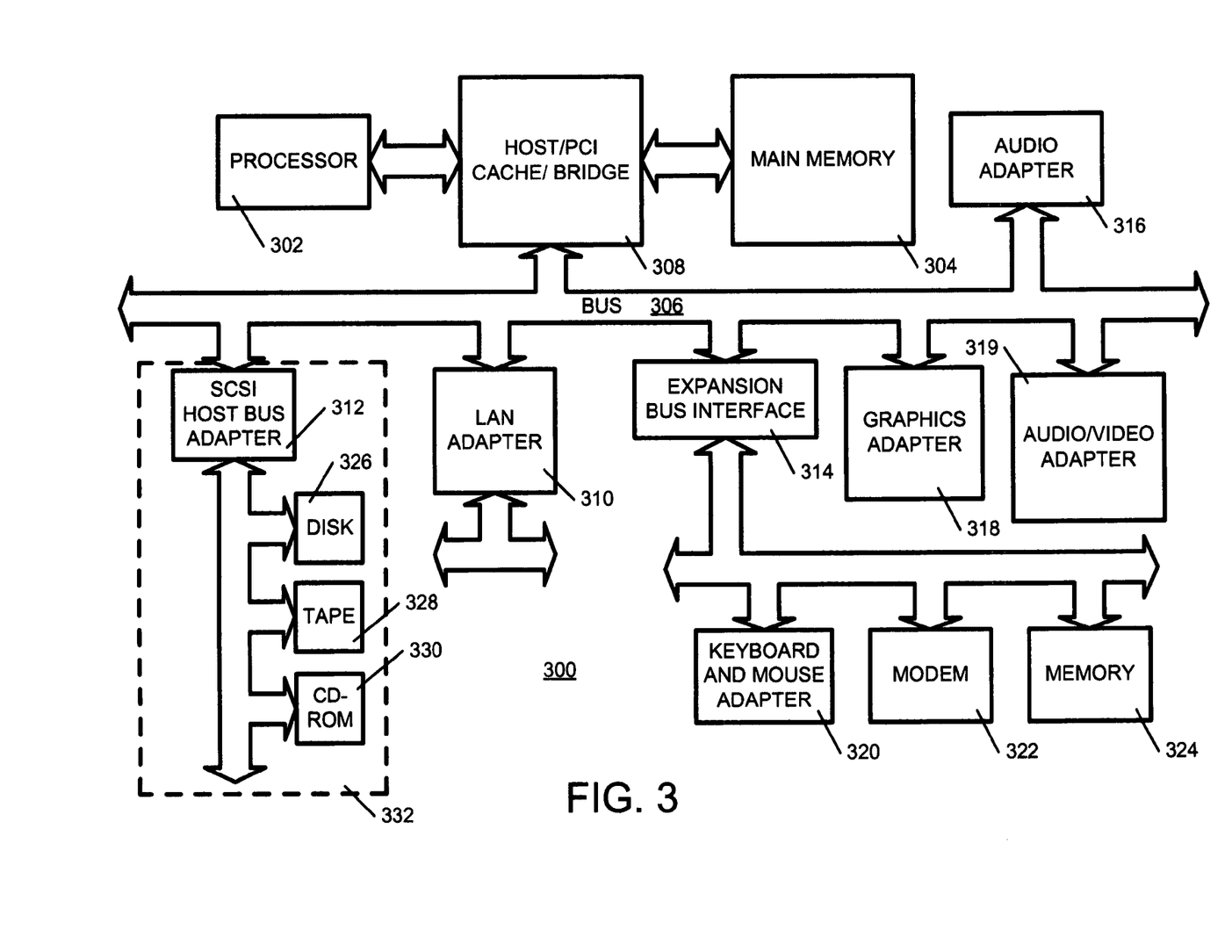
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of displaying a particular desktop based on a network connection or a scheduler. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

As mentioned earlier, in some environments certain images or items (i.e., icons, background and screen saver etc.) may not be suitable for display on a desktop. Nonetheless, a user may not want to permanently delete these items from the desktop. The invention uses a plurality of desktops from which one may be chosen based on the environment in which the computer system is being used.

Two methods of determining when a particular desktop is to be used are going to be described. However, the invention is not restricted to only these two methods. Any other method that may be used to select one of a plurality of desktops to display is well within the scope and spirit of the invention. Furthermore, the invention will be used using the Windows operating system. But, although the Windows operating system is used to describe the invention, the invention is not restricted to this operating system. Any other operating system may be used with the invention so long as one of a plurality of desktops may be chosen based on an environment in which the computer system is being used.

Figure 4:
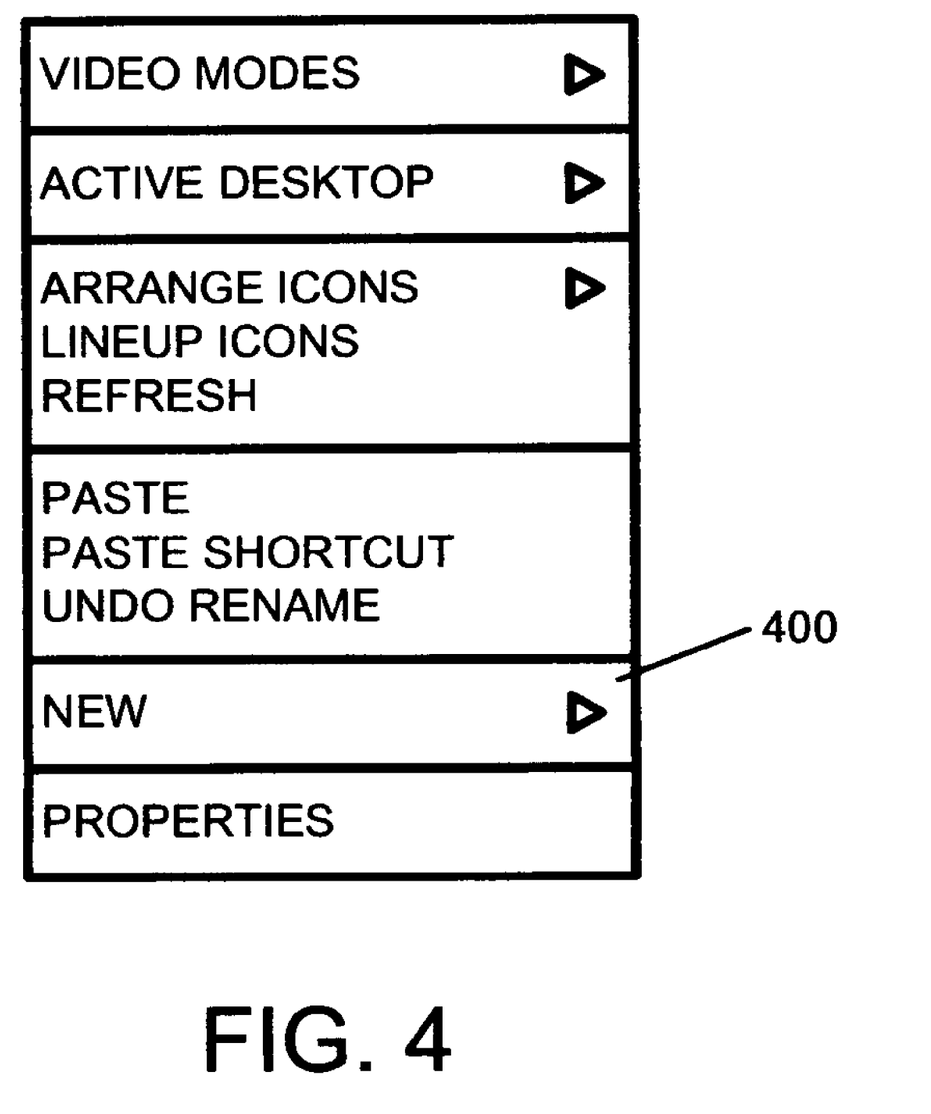
FIG. 4 depicts a display of a GUI used to access a desktop.
Figure 5:
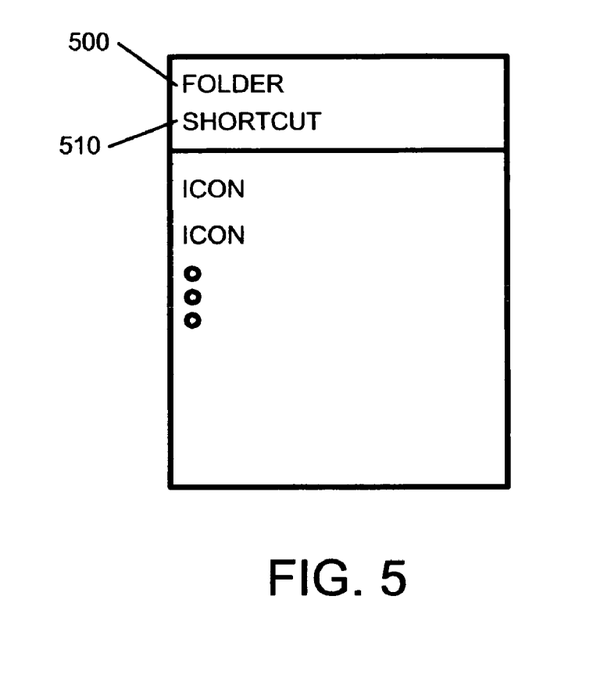
FIG. 5 illustrates a display of a GUI used to create items on a desktop.

To access and make changes to the desktop, a user needs to depress the right button of a mouse while the desktop is displayed. When this is done, FIG. 4 is displayed. New item 400 allows a user to create a new folder, create a shortcut (i.e., linking an icon to the program the icon represents) and adding new icons to the desktop. FIG. 5 depicts a menu that is displayed when the mouse is on new item 400. In FIG. 5, when a user clicks on folder 500, a new folder is created on the desktop. Likewise, if a user clicks on shortcut 510, the user can point to the location where the item is located such that an icon may be linked to the item.

Figure 6:
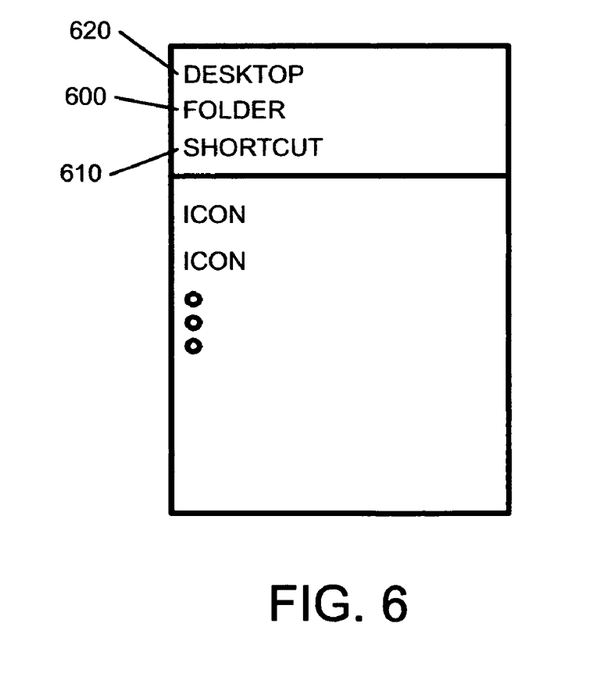
FIG. 6 depicts a display of a GUI used to create items on a desktop used by the invention.

The invention adds one more item (a desktop item) to FIG. 5. In FIG. 6, desktop item 620 is displayed. To create alternate desktops, a user may click on desktop item 620. When done, a window may pop up requesting that the user enter when the desktop is to be displayed. The user may enter "anytime except between Monday to Friday, from eight (8) in the morning to five (5) in the afternoon" when possibly the user may be at work. To finalize the change, the user may assert an "OK" button to have the entry stored. Consequently, when the computer system is in use between the time specified, this desktop will be used.

Figure 7:
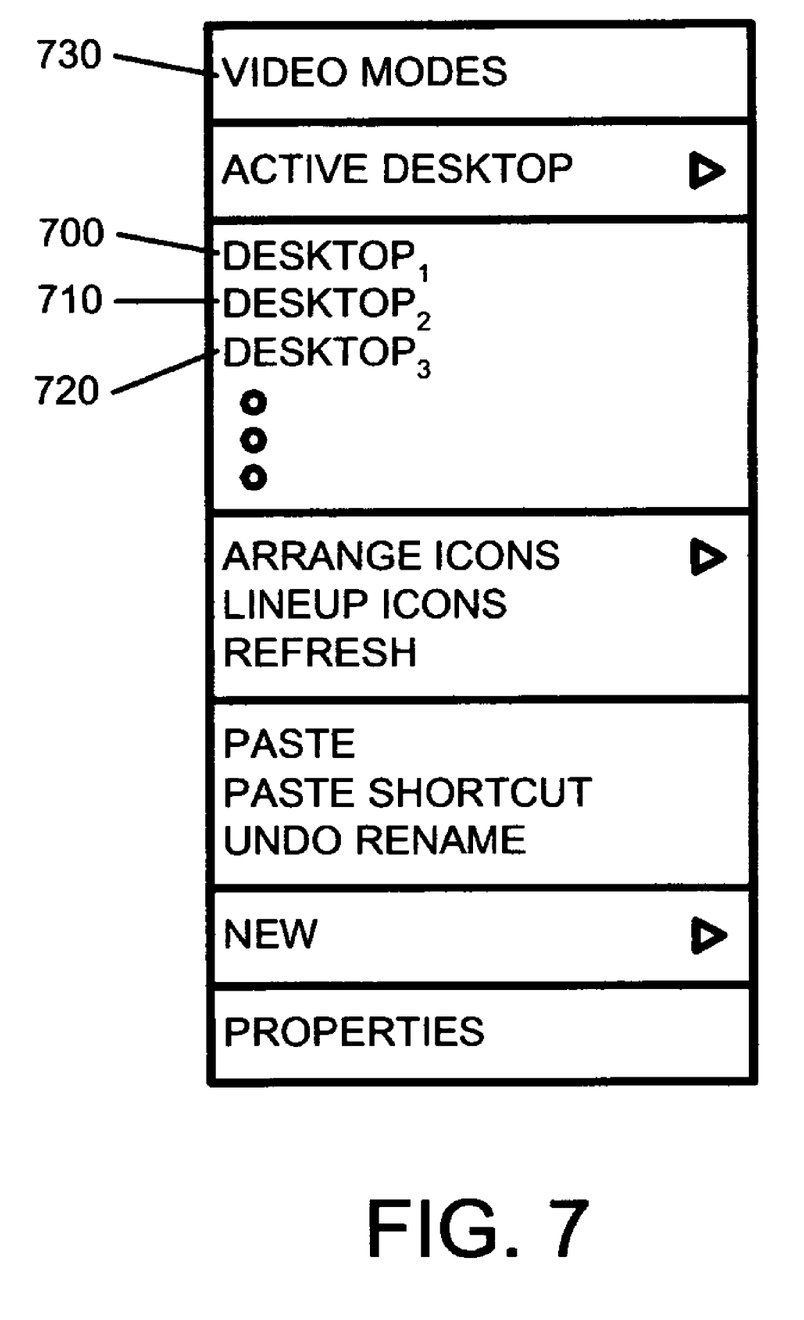
FIG. 7 depicts a display of GUI for accessing a desktop used by the invention.

Whenever the user accesses the desktop anytime thereafter (i.e. when a user clicks on the right mouse button while the desktop is displayed), FIG. 7 will be displayed. In FIG. 7, desktop$_1$ 700, desktop$_2$ 710, desktop$_3$ 720 . . . are added desktops. Active desktop 730 is the desktop that is currently being used. Desktops 700-720 may be displayed in FIG. 7 with their constraints (i.e., the time between which they will be used). In addition, desktops 700-720 may be customized when active. To activate the desktop a user may double click on the particular desktop. When that is done, the user may customize the desktop as it is usually done.

Alternatively, depending on the network connection or the IP (Internet Protocol) address of the computer system the user is currently using, the invention may determine which desktop to display. An IP address is an identifier for a computer system or device on a TCP/IP (Transmission Control Protocol/Internet Protocol) network. TCP/IP is a suite of protocols used to connect computer systems on the Internet. Networks using the TCP/IP protocol route messages based on the IP address of the destination system. Thus, each computer system on the Internet has a unique IP address.

The IP address consists of four numbers separated each by a period. Each number may be between zero (0) and 255. For example, 1.160.10.240 may be an IP address. The four numbers are used to identify a particular network and a specific computer system on that network. Thus, each company that has a network (i.e., an Intranet) is assigned a number identifying the network.

Thus, the invention may be designed or the user may specify ahead of time that if the computer system is behind a company's firewall (i.e., is part of a company's Intranet) a particular desktop is to be displayed. Thus, when the user is creating a desktop, a window may pop open requesting that the user confirm that the desktop is to be displayed only when the computer system is behind the company's firewall. If the user does so confirm, the IP address of the computer system may be stored in association with the desktop. Whenever, the computer is turned on, it will check to see whether it is within the company's Intranet. If so, the desktop will be used. If not, a default desktop may be used or another desktop which may be associated with another IP address may be displayed. That is, the user may also associate a desktop with the IP address the computer system would have when used at home.

Note that, if the computer system does not know its IP address, it can simply use the reverse address resolution protocol (RARP) to find out its own address. ARP (address resolution protocol) is the protocol used by TCP/IP to convert a physical address into an IP address. A computer system wishing to find out an IP address of another computer system broadcasts an ARP request onto the network or Internet. A computer system on the network that has the IP address responds with its physical address. RARP, on the other hand, is used to obtain a computer system's own IP address. A computer system wishing to find out its own IP address broadcasts its own physical address on the network and the RARP server (the server that assigns IP addresses to the computer systems in the network) will reply with the computer system's IP address. Thus, as the computer system is turned on, it can request its own IP address if it does not already know it. Based on its IP address, it can use the appropriate desktop.

The invention may also be used for commercial purposes. For example, when a user accesses the Internet through an ISP (Internet Service Provider), the ISP may download onto the user's computer system a desktop. The desktop may have icons representing goods that are for sale, advertisements, links to Websites etc. Depending on the implementation, when the user exits the Internet, the desktop may or may not remain on the user's computer system.

Figure 8:
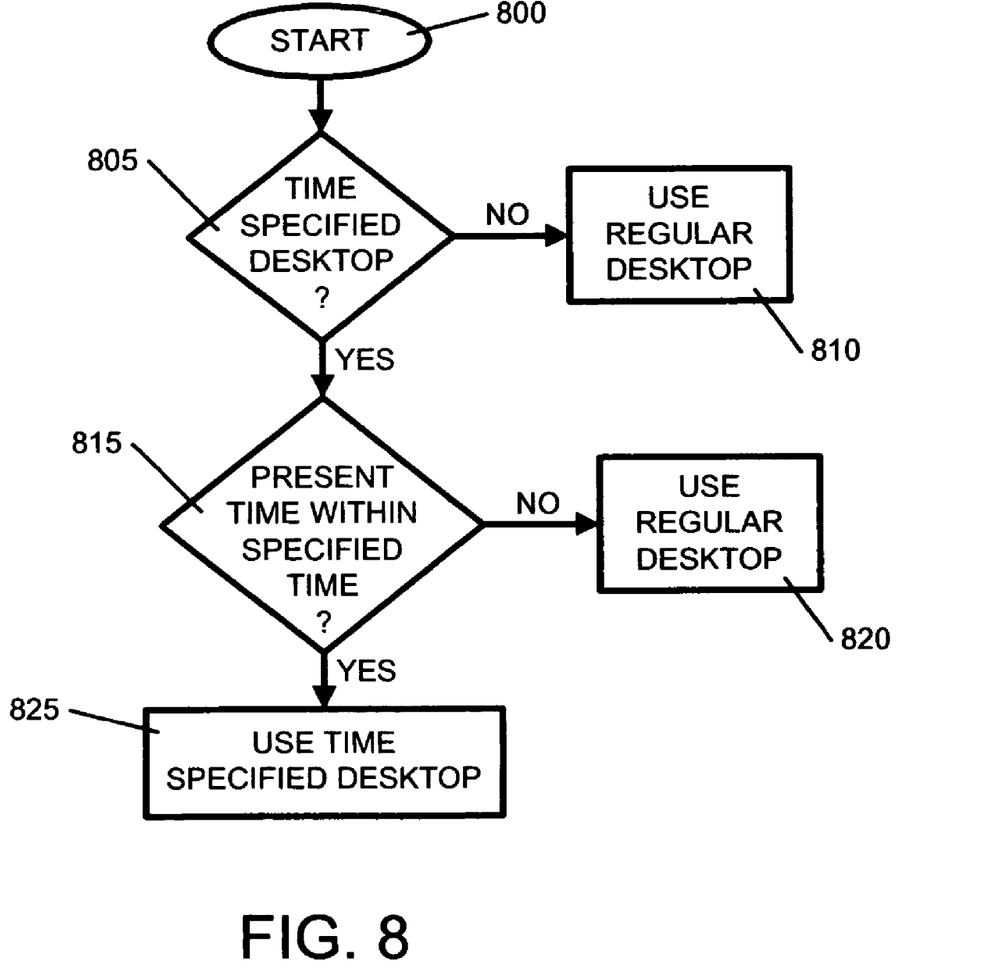
FIG. 8 depicts a flow diagram of a first process used by the invention.

FIG. 8 is a flow diagram of the invention using the scheduler method. The process starts as soon as the computer is turned on (step 800). A check is made as to whether there exists a time specified desktop. If not, the regular or a default desktop is used (steps 805 and 810). If so, a check is made as to whether the present time is within the time specified (steps 805 and 815). If not, the regular or default desktop is used (step 820). If the time is within the specified time, the desktop associated with the specified time is used.

Figure 9:
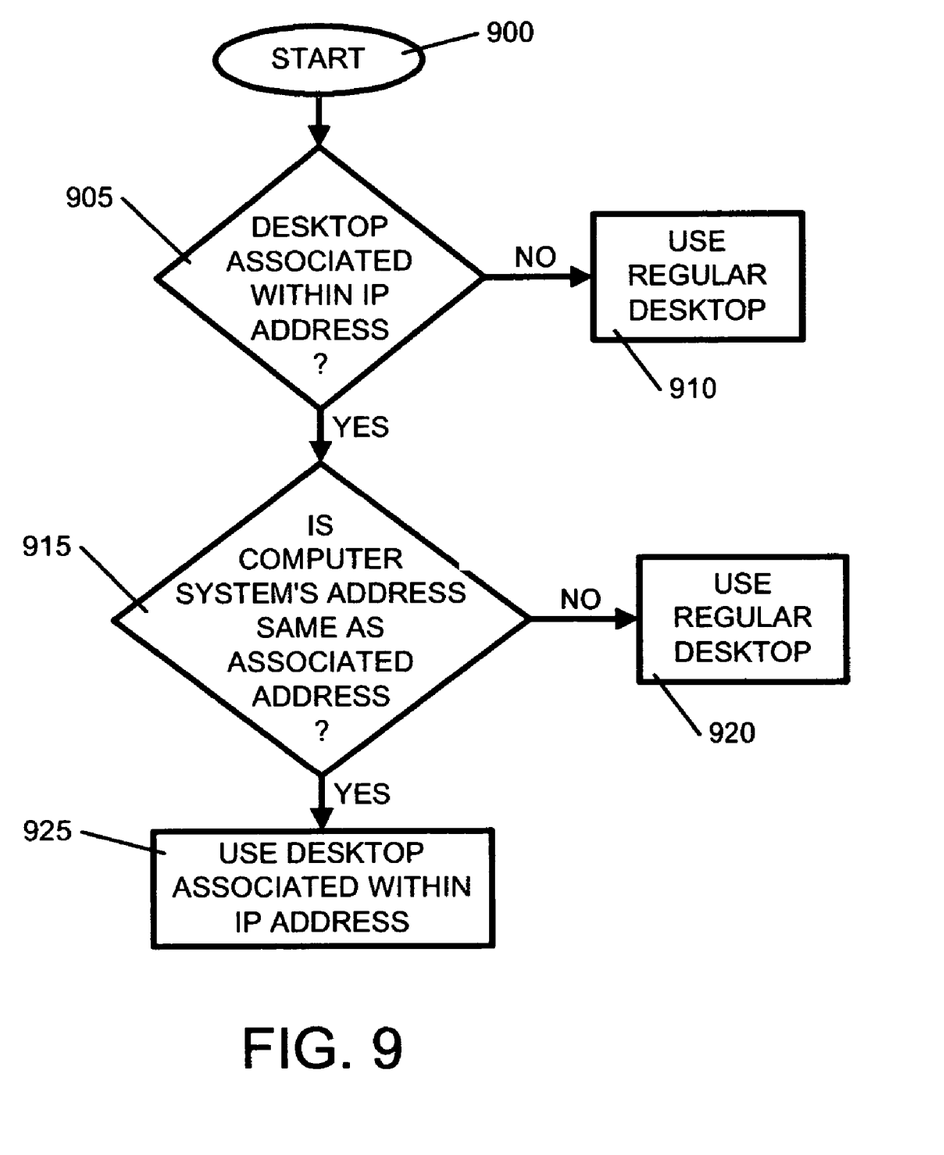
FIG. 9 illustrates a flow diagram of a second process used by the invention.

FIG. 9 is a flow diagram of the invention using the IP address method described above. Again, the process starts when the computer system is turned on (step 900). Then a check is made to determine whether there is a desktop associated with an IP address. If not, the regular or default desktop is used (steps 905 and 910). If yes, then another check is made to determine whether the associated IP address is the same as the computer system's IP address (steps 905 and 915). As mentioned above, if the computer does not know its IP address, it may send a query to figure it out. Of course, if the computer is not connected to the Internet or a network, the query may not be sent. At this point, the regular or default desktop may be used. In any case, provided that the computer system is on a network and the IP address returned is the same as the IP address stored with the desktop, this particular desktop is then used (step 925).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of using a desktop of a computer system of a user for commercial purposes, the desktop being a first screen displayed automatically by the computer system upon the computer system being turned on, the method comprising:

associating a first desktop with a network address;

automatically comparing the network address associated with the first desktop to a network address assigned to the computer system when the computer system is turned on in order to determine the first screen to be automatically displayed by the computer system;

displaying the first desktop in response to determining that the network address associated with the first desktop is equal to the network address assigned to the computer system, the first desktop being the first screen automatically displayed by the computer system upon the computer system being turned on;

enabling the computer system to access a Website, the Website having a second desktop for use for commercial purposes, the commercial purposes including sales of goods and advertisements in response to determining that the network address associated with the first desktop is not equal to the network address assigned to the computer system;

enabling the computer system to download the second desktop; and displaying the second desktop, the second desktop being the first screen automatically displayed by the computer system upon the computer system being turned on.

2. The method of claim 1 wherein the first desktop is stored on the computer system.

3. A computer program product on a computer storage medium having code means, which when executed by a processor enabling a desktop of a computer system of a user to be used for commercial purposes, the desktop being a first screen displayed automatically by the computer system upon the computer system being turned on and initialized, the code means comprising:

code means for associating a first desktop with a network address;

code means for automatically comparing the network address associated with the first desktop to a network address assigned to the computer system when the computer system is turned on in order to determine the first screen to be automatically displayed by the computer system;

code means for displaying the first desktop in response to determining that the network address associated with the first desktop is equal to the network address assigned to the computer system, the first desktop being the first screen automatically displayed by the computer system upon the computer system being turned on;

code means for enabling the computer system to access a Website, the Website having a second desktop for use for commercial purposes, the commercial purposes including sales of goods and advertisements in response to determining that the network address associated with the first desktop is not equal to the network address assigned to the computer system;

code means for enabling the computer system to download the second desktop; and code means for displaying the second desktop, the second desktop being the first screen automatically displayed by the computer system upon the computer system being turned on.

4. The computer program product of claim 3 wherein the first desktop is stored on the computer system.

5. An apparatus for enabling a desktop of a computer system of a user to be used for commercial purposes, the desktop being a first screen displayed automatically by the computer system upon the computer system being turned on and initialized, the apparatus comprising:

means for associating a first desktop with a network address;

means for automatically comparing the network address associated with the first desktop to a network address assigned to the computer system when the computer system is turned on in order to determine the first screen to be automatically displayed by the computer system;

means for displaying the first desktop in response to determining that the network address associated with the first desktop is equal to the network address assigned to the computer system, the first desktop being the first screen automatically displayed by the computer system upon the computer system being turned on;

means for enabling the computer system to access a Website, the Website having a second desktop for use for commercial purposes, the commercial purposes including sales of goods and advertisements in response to determining that the network address associated with the first desktop is not equal to the network address assigned to the computer system;

means for enabling the computer system to download the second desktop; and means for displaying the second desktop, the second desktop being the first screen automatically displayed by the computer system upon the computer system being turned on.

6. The apparatus of claim 5 wherein the first desktop is stored on the computer system.

7. A computer system using a desktop for commercial purposes, the desktop being a first screen displayed automatically by the computer system upon the computer system being turned on and initialized, the computer system comprising:

at least one memory device for storing code data; and at least one processor for processing said code data to associate a first desktop with a network address, to automatically compare the network address associated with the first desktop to a network address assigned to the computer system when the computer system is turned on in order to determine the first screen to be automatically displayed by the computer system, to display the first desktop in response to determining that the network address associated with the first desktop is equal to the network address assigned to the computer system, the first desktop being the first screen automatically displayed by the computer system upon the computer system being turned on, to access a Website, the Website having a second desktop for use for commercial purposes, the commercial purposes including sales of goods and advertisements in response to determining that the network address associated with the first desktop is not equal to the network address assigned to the computer system, to enable the computer system to download the second desktop, and to display the second desktop, the second desktop being the first screen automatically displayed by the computer system upon the computer system being turned on.

8. The computer system of claim 7 wherein the first desktop is stored on the computer system.

* * * * *